(12) United States Patent
Maskalik et al.

(10) Patent No.: US 10,212,195 B2
(45) Date of Patent: Feb. 19, 2019

(54) MULTI-SPOKE CONNECTIVITY OF PRIVATE DATA CENTERS TO THE CLOUD

(71) Applicant: VMware, Inc., Palo Alto, CA (US)

(72) Inventors: Serge Maskalik, Los Gatos, CA (US); Aravind Srinivasan, Santa Clara, CA (US); Debashis Basak, San Jose, CA (US); Sachin Thakkar, San Jose, CA (US); Allwyn Sequeira, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 310 days.

(21) Appl. No.: 14/981,424

(22) Filed: Dec. 28, 2015

(65) Prior Publication Data

US 2017/0063667 A1    Mar. 2, 2017

Related U.S. Application Data

(60) Provisional application No. 62/211,696, filed on Aug. 29, 2015.

(51) Int. Cl.
*H04L 29/06* (2006.01)
*H04L 29/08* (2006.01)
*H04L 12/26* (2006.01)

(52) U.S. Cl.
CPC ...... *H04L 65/1069* (2013.01); *H04L 43/0852* (2013.01); *H04L 65/102* (2013.01); *H04L 67/10* (2013.01)

(58) Field of Classification Search
CPC ............... H04L 45/121; H04L 41/5009; H04L 43/0852; H04L 65/1069; H04L 67/10; H04L 41/5096; H04L 43/50; H04L 65/102
See application file for complete search history.

(56) References Cited

U.S. PATENT DOCUMENTS

| | | | |
|---|---|---|---|
| 8,516,158 B1* | 8/2013 | Wu | H04L 69/04 709/223 |
| 8,670,326 B1* | 3/2014 | Balasubramanian | H04L 45/22 370/238 |
| 2015/0036684 A1* | 2/2015 | Modi | H04L 45/22 370/389 |
| 2015/0096011 A1* | 4/2015 | Watt | H04L 63/0272 726/15 |
| 2015/0139238 A1* | 5/2015 | Pourzandi | H04L 45/42 370/392 |
| 2015/0281078 A1* | 10/2015 | Luo | H04L 67/2814 709/203 |

* cited by examiner

*Primary Examiner* — Brian J. Gillis
*Assistant Examiner* — Chhian (Amy) Ling
(74) *Attorney, Agent, or Firm* — Patterson + Sheridan, LLP

(57) ABSTRACT

A hybrid computing system includes an on-premise data center and a cloud computing system. To connect between an organization's multiple data centers, a gateway may instead utilize the connections between the private data center and the cloud computing system rather than a direct connection to the other of the organizations' data centers.

20 Claims, 8 Drawing Sheets

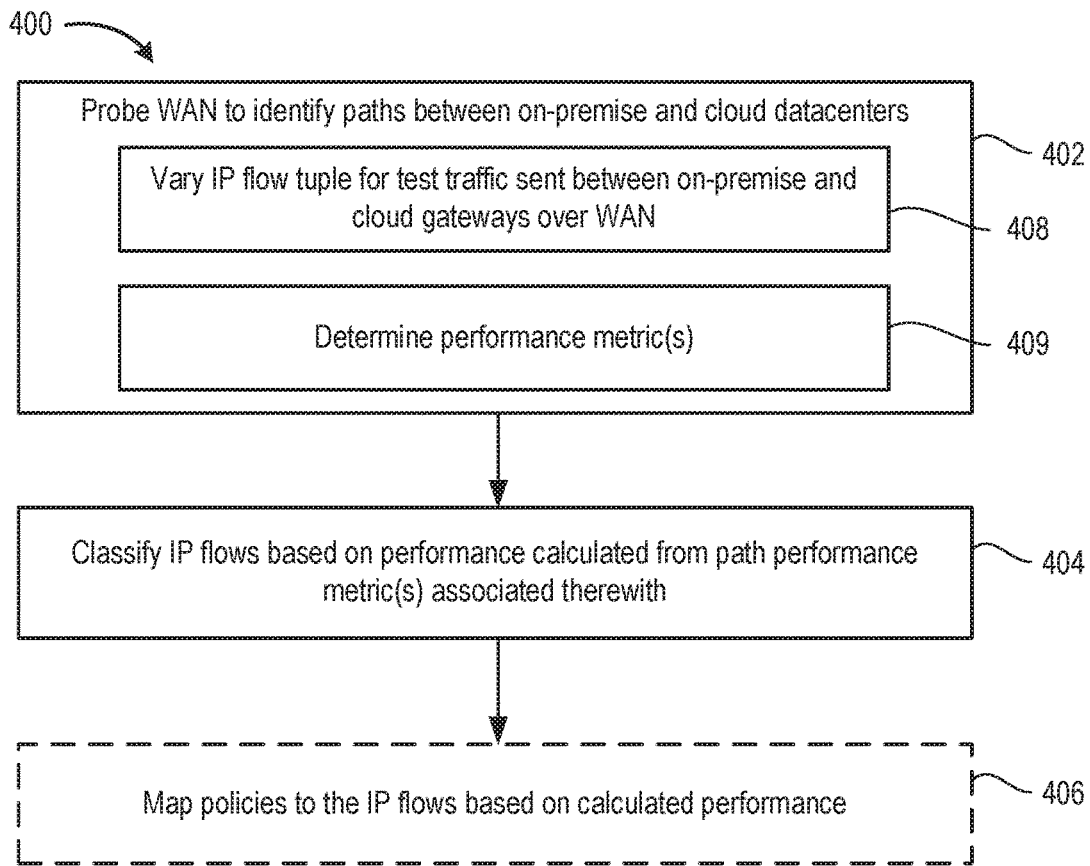

MULTI-SPOKE CONNECTIVITY OF PRIVATE DATA CENTERS TO THE CLOUD

CROSS-REFERENCE TO RELATED APPLICATION(S)

This application claims the benefit of U.S. Provisional Patent Application No. 62/211,696, filed Aug. 29, 2015, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud Director® cloud architecture software, AmazonEC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "on-premise data centers"). The public cloud can include a multi-tenant cloud architecture providing IaaS cloud services. Typically, the customer data centers are connected to the cloud data centers through a wide area network (WAN) comprising multiple service provider backbone networks. As such, there can be multiple communication paths between customer data centers and cloud data centers. Given the many communication paths, it is desirable to optimize connectivity between customer data centers and cloud data centers in a hybrid cloud system.

SUMMARY

Embodiments of the present disclosure provide a method of providing connectivity between data centers in a hybrid cloud system. The method includes determining a first latency between first and second data centers managed by a first organization and determining a second latency between the first data center and a cloud computing system managed by a second organization. The first organization is a tenant in the cloud computing system. The method further includes establishing a path-optimized connection between the first and second data centers based on the first latency and the second latency, wherein the path-optimized connection travels between a gateway of the first data center through a gateway of the cloud computing system and to a gateway of the second data center.

Embodiments of the present disclosure also provide a non-transitory computer-readable storage medium comprising instructions that, when executed in a computing device, provide connectivity between data centers in a hybrid cloud system, by performing the steps of determining a first latency between first and second data centers managed by a first organization, determining a second latency between the first data center and a cloud computing system managed by a second organization, and establishing a path-optimized connection between the first and second data centers based on the first latency and the second latency. The first organization is a tenant in the cloud computing system. The path-optimized connection travels between a gateway of the first data center through a gateway of the cloud computing system and to a gateway of the second data center.

Another embodiment of the present disclosure provides a computer system for provide connectivity between data centers in a hybrid cloud system. The computer system includes a system memory and a processor programmed to determine a first latency between first and second data centers managed by a first organization, and determine a second latency between the first data center and a cloud computing system managed by a second organization. The first organization may be a tenant in the cloud computing system. The processor is further configured to establish a path-optimized connection between the first and second data centers based on the first latency and the second latency, wherein the path-optimized connection travels between a gateway of the first data center through a gateway of the cloud computing system and to a gateway of the second data center.

BRIEF DESCRIPTION OF THE DRAWINGS

FIG. 4 is a flow diagram depicting a method of identifying and classifying paths in a wide area network (WAN) according to embodiments.

FIG. 5 illustrates an example database that can be maintained by a gateway for identifying and classifying paths in a WAN according to embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
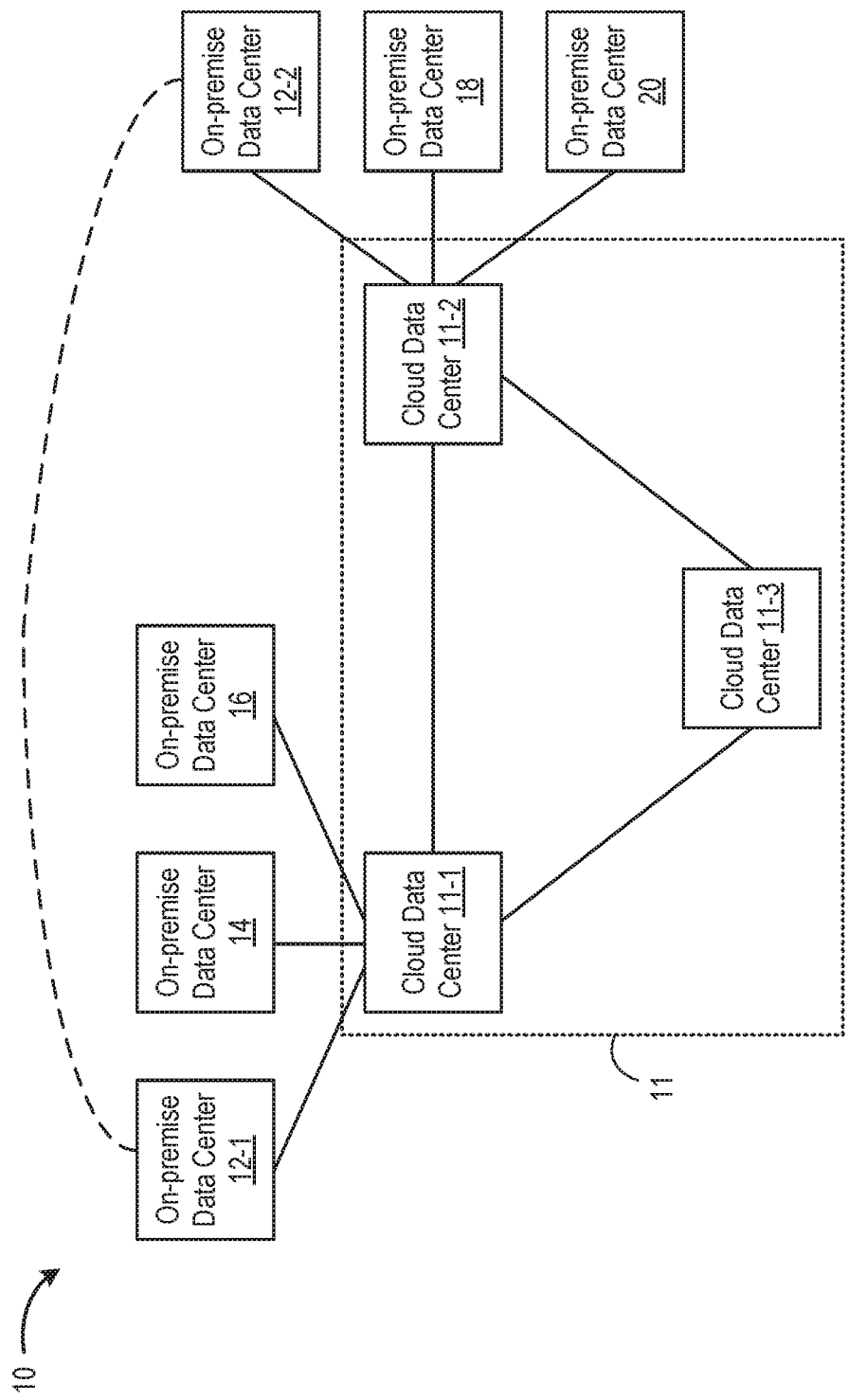
FIG. 1 is a block diagram of a hybrid cloud computing system in which one or more embodiments of the present disclosure may be utilized.

FIG. 1 is a block diagram of a hybrid cloud computing system 10 in which one or more embodiments of the present disclosure may be utilized. Hybrid cloud computing system 10 includes a plurality of virtualized computing systems implemented within on-premise data centers and a cloud computing system 11. In the example of FIG. 1, hybrid cloud computing system 10 includes on-premise data centers 12-1, 12-2, 14, 16, 18, and 20, each of which is communicatively coupled to cloud computing system 11. In the example of FIG. 1, cloud computing system 11 includes cloud data centers 11-1, 11-2, and 11-3. The number of cloud data centers and the number of on-premise data centers shown in FIG. 1 is just one example. In general, there can be any number of on-premise data centers communicatively coupled to cloud computing system 11, which can include any number of cloud data centers.

Hybrid cloud computing system 100 is configured to provide a common platform for managing and executing virtual workloads seamlessly between on-premise data centers and cloud data centers. In one embodiment, an on-premise data center may be a data center controlled and administrated by a particular enterprise or business organization, while cloud data centers of cloud computing system 11 may be operated by a cloud computing service provider and exposed as a service available to account holders, such as the particular enterprise in addition to other enterprises. As such, on-premise data center(s) of an enterprise may sometimes be referred to as a "private" cloud, and cloud computing system 11 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

In the example of FIG. 1, on-premise data centers 12-1, 14, and 16 are communicatively coupled to cloud data center 11-1, and on-premise data centers 12-2, 18, and 20 are communicatively coupled to cloud data center 11-2. A given on-premise data center can be coupled to one or more cloud data centers through one or more network connections, including direct network connections (e.g., private connections) and/or public network connections (e.g., public Internet connections). On-premise data centers 12-1 and 12-2 can be controlled and administered by the same enterprise, whereas on-premise data centers 14, 16, 18, and 20 can be controlled and administered by separate enterprises. In some embodiments, on-premise data center 12-1 can be communicatively coupled to on-premise data center 12-2 through one or more network connections. That is, a given enterprise's private cloud can include a plurality of on-premise data centers with network connectivity therebetween. Likewise, cloud data centers 11-1, 11-2, and 11-3 can include one or more network connections to support network connectivity therebetween.

In some embodiments, cloud data centers 11-1, 11-2, and 11-3 are located to support particular geographic regions. Thus, on-premise data centers 12-1, 14, and 16 can be located in one geographic region served by cloud data center 11-1. On-premise data centers 12-2, 18, and 20 can be located in another geographic region served by cloud data center 11-2. Cloud data center 11-3 can serve yet another geographic region having one or more on-premise data centers (not shown).

Figure 2:
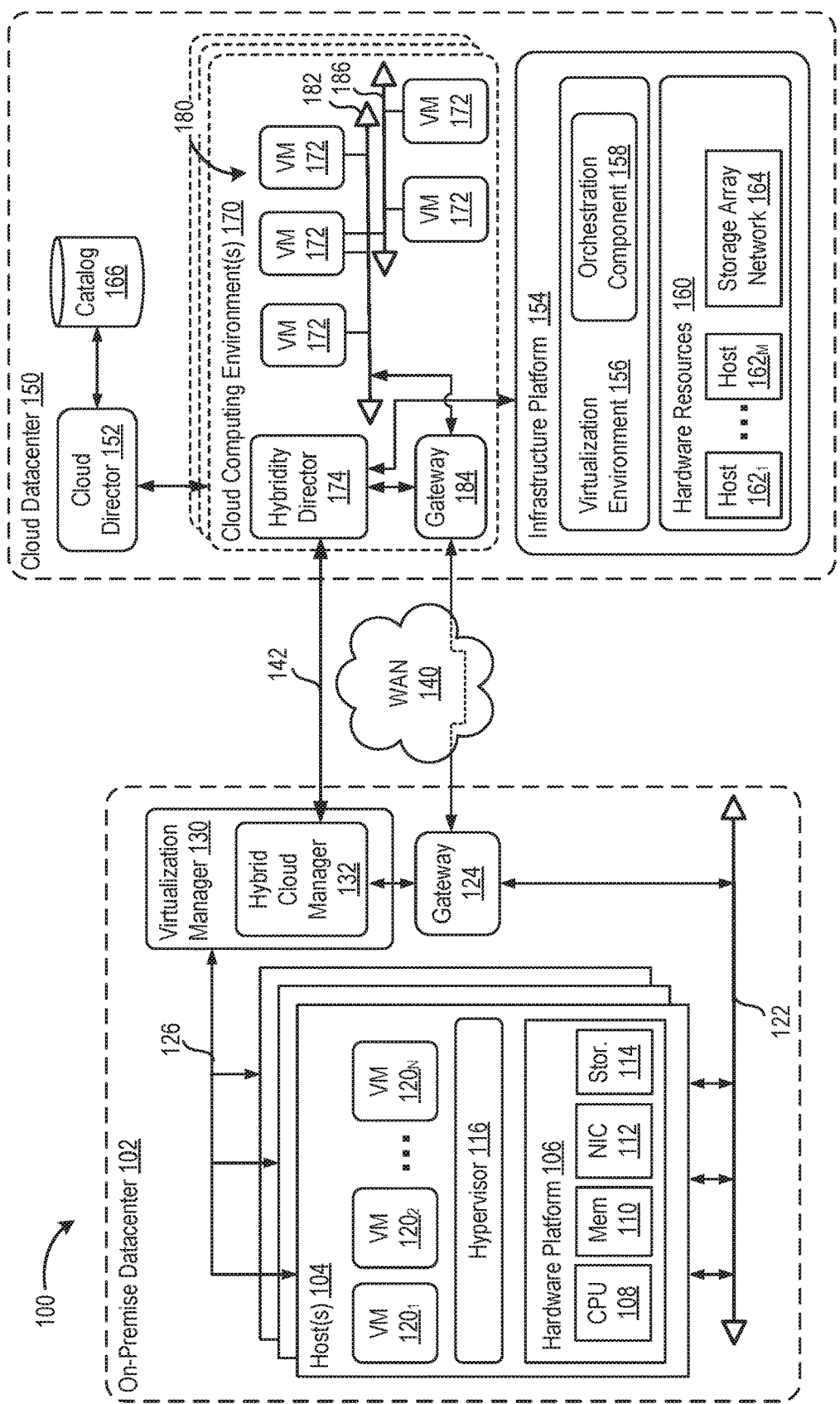
FIG. 2 is a block diagram of a portion of a hybrid cloud computing system in which one or more embodiments of the present disclosure may be utilized.

FIG. 2 is a block diagram of a hybrid cloud computing system 100 in which one or more embodiments of the present disclosure may be utilized. Hybrid cloud computing system 100 includes a virtualized computing system implementing an on-premise data center 102 and a virtualized computing system implementing a cloud data center 150. Hybrid cloud computing system 100 is a subset of hybrid cloud computing system 10 with one on-premise data center and one cloud data center. It is to be understood that each on-premise data center coupled to a cloud computing system can be configured similarly to on-premise data center 102, and each cloud data center that is part of a cloud computing system can be configured similarly to cloud data center 150. In this regard, on-premise data center 102 can be one of on-premise data centers 12-1, 12-2, 14, 16, 18, 20, and cloud data center 150 can be one of cloud data centers 11-1, 11-2, and 11-3 shown in FIG. 1.

On-premise data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphereg solution made commercially available from VMware, Inc. of Palo Alto, Calif. Hypervisor 116 may run on top of the operating system of host 104 or directly on hardware components of host 104.

On-premise data center 102 includes a virtualization management component (depicted in FIG. 2 as virtualization manager 130) that may communicate to the plurality of hosts 104 via a network, sometimes referred to as a management network 126. In one embodiment, virtualization manager 130 is a computer program that resides and executes in a central server, which may reside in on-premise data center 102, or alternatively, running as a VM in one of hosts 104. One example of a virtualization manager is the vCenterServer™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise data center 102 with connectivity to an external wide area network (WAN) 140 (e.g., the public Internet). Gateway 124 may manage external public IP addresses for VMs 120 and route traffic incoming to and outgoing from on-premise data center 102 and provide networking services, such as firewalls, network address translation (NAT), dynamic host configuration protocol (DHCP), load balancing, and virtual private network (VPN) connectivity over WAN 140. As described further herein, gateway 124 can optimize connectivity between on-premise data center 102 and cloud data center 150 through WAN 140.

In one or more embodiments, cloud data center 150 is configured to dynamically provide an enterprise (or users of an enterprise) with one or more virtual data centers 180 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 2, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing on-premise data center 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 2, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 2, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to WAN 140 (e.g., the public Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over WAN 140 with another VPN endpoint, such as gateway 124 within on-premise data center 102. In other embodiments, gateway 184 may be configured to connect to communicate with on-premise data center 102 using a high-throughput, dedicated link (depicted as a direct connect 142) between on-premise data center 102 and cloud computing system 150. In one or more embodiments, gateways 124 and 184 are configured to provide a "stretched" layer-2 (L2) network that spans on-premise data center 102 and virtual data center 180, as shown in FIG. 2.

While FIG. 2 depicts communication between on-premise gateway 124 and cloud-side gateway 184 for illustration purposes, it should be recognized that communication between multiple on-premise gateways 124 and cloud-side gateways 184 may be used. Furthermore, while FIG. 2 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in on-premise data center 102 to enable a common virtualized computing platform between on-premise data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

Figure 3:
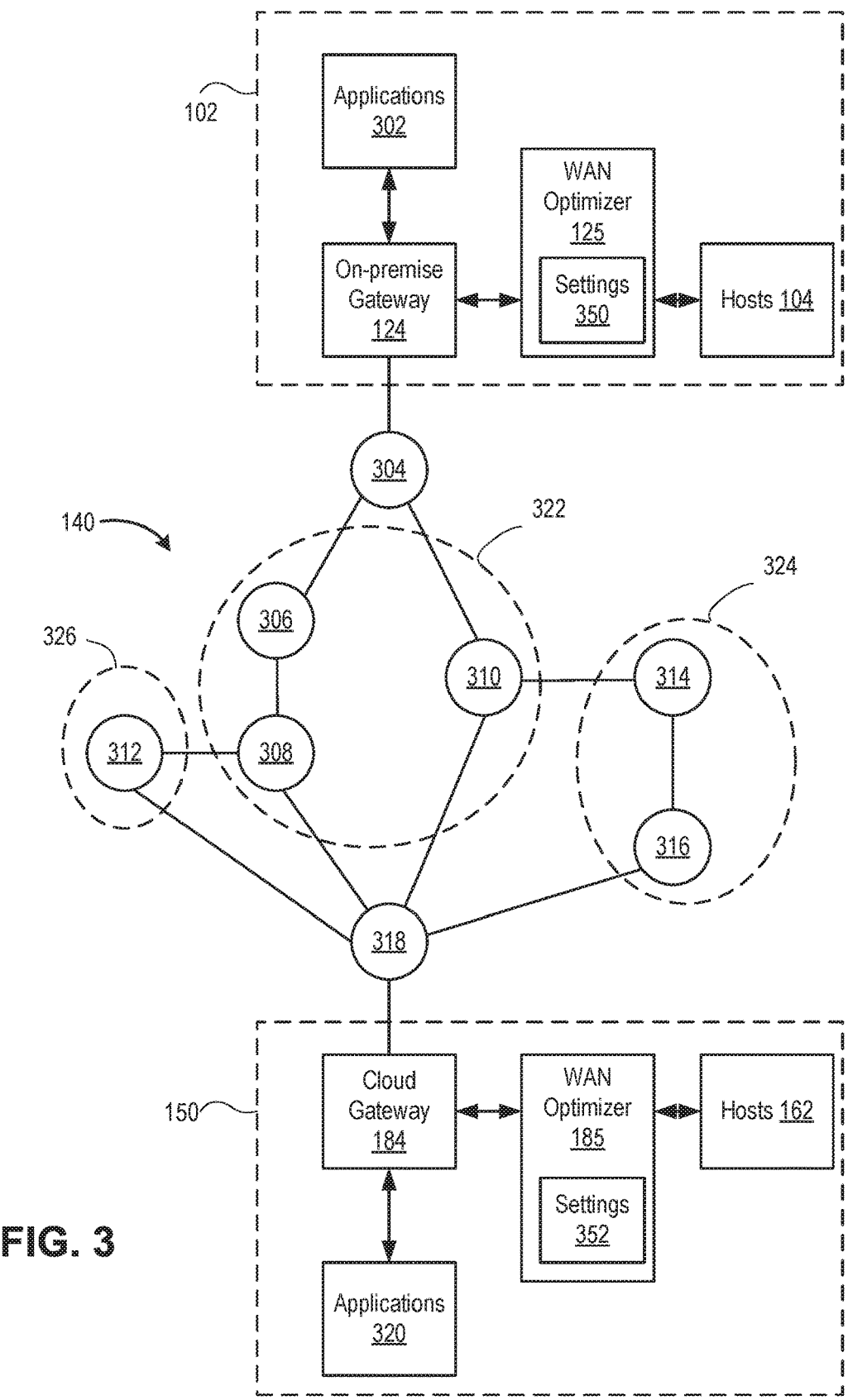
FIG. 3 is a block diagram depicting a logical view of hybrid cloud computing system of FIG. 2 according to embodiments.

FIG. 3 is a block diagram depicting a logical view of hybrid cloud computing system 100 according to embodiments. Various applications 302 execute within on-premise data center 102 and are configured for communication with on-premise gateway 124 to obtain access to WAN 140. Applications 302 can include any software application, process, thread, or the like executing on a computer (e.g., virtual or physical) within on-premise data center 102. Likewise, various applications 320 execute within cloud data center 150 and are configured for communication with cloud gateway 184 to obtain access to WAN 140. Applications can include any software application, process, thread, or the like executing on a computer (e.g., virtual or physical) within cloud data center 150.

Some applications 302 in on-premise data center 102 can cooperate with other applications 320 in cloud data center 150. As such, some applications 302 can communicate with other applications 320 through WAN 140. For example, a VM migration process executing within on-premise data center 102 can cooperate with a VM migration process executing within cloud data center 150 to migrate a VM from on-premise data center 102 to cloud data center 150 over WAN 140. VM migration is merely one example of a myriad of applications designed to cooperate through communication over WAN 140. To initiate communication, an application 302 can communicate with on-premise gateway 124 to establish a connection through WAN 140 between on-premise gateway 124 and cloud gateway 184. Alternatively, an application 302 can communicate with cloud gateway 184 to establish a connection through WAN 140 between on-premise gateway 124 and cloud gateway 184.

WAN 140 includes a plurality of communication nodes. Each communication node can include one or more network devices, such as routers, switches, and the like. Different sets of communication nodes can be managed by different service providers, such as network service providers (NSPs), Internet service providers (ISPs), and the like. In the example of FIG. 3, WAN 140 includes communication nodes 304 through 318. Communication nodes 306, 308, and 310 are controlled by a service provider 322. Communication nodes 314 and 316 are controlled by a service provider 324. Communication node 312 is controlled by a service provider 326. Communication node 304 comprises an edge node coupled to on-premise gateway 124 and can be controlled by a service provider or by the enterprise that controls on-premise data center 102. Communication node 318 comprises an edge node coupled to cloud gateway 184 and can be controlled by a service provider or by the cloud service provider that controls cloud data center 150.

Service providers 322, 324, and 326 are typically third parties with respect to the enterprise controlling on-premise data center 102 and the cloud service provider controlling cloud data center 150. As such, neither the enterprise nor the cloud service provider has control over the communication nodes in WAN 140, other than potentially the edge nodes 304 and 318. As such, neither the enterprise nor the cloud service provider can control the path through WAN 140 for a connection between on-premise gateway 124 and cloud gateway 184. Service providers 322, 324, and 326 can implement one or more traffic management schemes to control traffic flow through their communication nodes. Example traffic management schemes include traffic shaping, traffic policing, and the like. Some traffic management schemes are content-based and can manage traffic according to the different applications that generate the traffic. Other traffic management schemes are route-based and can manage traffic according to different Internet Protocol (IP) flows. An IP flow is defined by an IP flow tuple of source IP address, source port, destination IP address, and destination port. The traffic management schemes implemented by service providers 322, 324, and 326 can affect the performance (e.g., latency, data rate, etc.) of connections between on-premise gateway 124 and cloud gateway 184. In some cases, the performance of an arbitrary connection through WAN 140 can less than that required by a given application. For example, a VM migration process can time-out or otherwise fail if the latency of a connection exceeds a particular threshold. While packet encryption (e.g., VPN) can be used to avoid content-based traffic management, such encryption does not avoid route-based traffic management based on IP flow.

In embodiments, gateways 124 and 184 are configured to optimize connectivity through WAN 140. FIG. 4 is a flow diagram depicting a method 400 of identifying and classifying paths in WAN 140 according to embodiments. Method 400 can be performed by a gateway, such as on-premise gateway 124 or cloud gateway 184. For purposes of clarity by example, method 400 is described as being performed by on-premise gateway 124.

Method 400 begins at step 402, where on-premise gateway 124 probes WAN 140 to identify paths between on-premise data center 102 and cloud data center 150. At any given time, WAN 140 can route packets (generally referred to as traffic) between on-premise gateway 124 and cloud gateway 184 through different sets of communication nodes. A path through WAN 140 includes a particular set of communication nodes. In an embodiment, on-premise gateway 124 can send and receive test traffic (test packets) to and from cloud gateway 184 to identify different paths. The test traffic can include different IP flows in an attempt to identify different paths through WAN 140. As discussed above, an IP flow is defined by an IP flow tuple. At step 408, on-premise gateway 124 can vary the IP flow tuple of the test traffic sent between on-premise gateway 1224 and cloud gateway 184 over WAN 140. In some embodiments, one or more of the source IP address, source port, destination IP address, and destination port can be varied for the test traffic. At a given time, one IP flow can cause traffic to flow through one path, and another IP flow can cause traffic to flow through another path. Traffic management schemes within WAN 140 are generally controlled by a network provider and may be outside the control of the organizations managing the on-premise and cloud data centers. For example, one traffic management scheme within WAN 140 may shape traffic based on port numbers used in the flow. In this example, on-premise gateway 124 varies the port numbers (source and/or destination) of the test traffic, which cause different routing paths to form within WAN 140 (as a result of the traffic management schemes). A set of IP flows can be tested by varying the IP flow tuple of the test traffic to identify a set of paths through WAN 140. Each path in the resulting set of paths can be associated with one or more IP flows. Conversely, each IP flow in the set of tested IP flows can be associated with one or more paths. At step 409, one or more performance metrics can be determined for each resulting path. Example performance metrics include latency and data rate.

In the example of FIG. 3, there is a path comprising nodes 304, 306, 308, and 318; another path comprising nodes 304, 310, and 318; another path comprising nodes 304, 310, 314, 316, and 318; and another path comprising nodes 304, 306, 308, 312, and 318. Each of the paths can exhibit different performance (e.g., different latency, different data rates, etc.). On-premise gateway 124 can send and receive test traffic using a set of IP flows to be tested. One or more of the IP flows can result in the test traffic traversing the path comprising nodes 304, 306, 308, and 318. One or more other of the IP flows can result in the test traffic traversing the path comprising nodes 304, 310, and 318. Other IP flows can result in the test traffic traversing the other paths. In this manner, different paths through WAN 140 can be identified and associated with the corresponding IP flow tuples.

At step 404, on-premise gateway 124 classifies the IP flows based on performance calculated from the determined performance metric(s) for the resulting paths. Performance metrics for one or more associated paths can be combined in various ways to compute an overall performance of a given IP flow. Thus, some IP flow can be classified as having higher performance, while other IP flows can be classified as having lower performance.

At optional step 406, on-premise gateway 124 can map different policies to the IP flows based on the calculated performance. Each policy can specify a certain level of performance. The policies can then be assigned to different types of application traffic either automatically by on-premise gateway 124, or specifically by an administrator. To facilitate automatic policy assignment, each policy can specify one or more constraints that need to be met before application traffic can be assigned that policy. The constraints can be based on various attributes, such as application traffic type, time of day, and the like.

FIG. 5 illustrates an example database 500 that can be maintained by on-premise gateway 124 according to embodiments. Database 500 includes a list of IP flows. For each IP flow, database 500 includes a performance associated with that IP flow. Database 500 can optionally include other information for each IP flow, such as which policies are mapped to each IP flow, which paths resulted from each IP flow, and the like. On-premise gateway 124 can repeatedly perform method 400 to maintain and update database 500 over time. Method 400 can be performed by any other gateway in a hybrid cloud computing system in a similar fashion.

Figure 6:
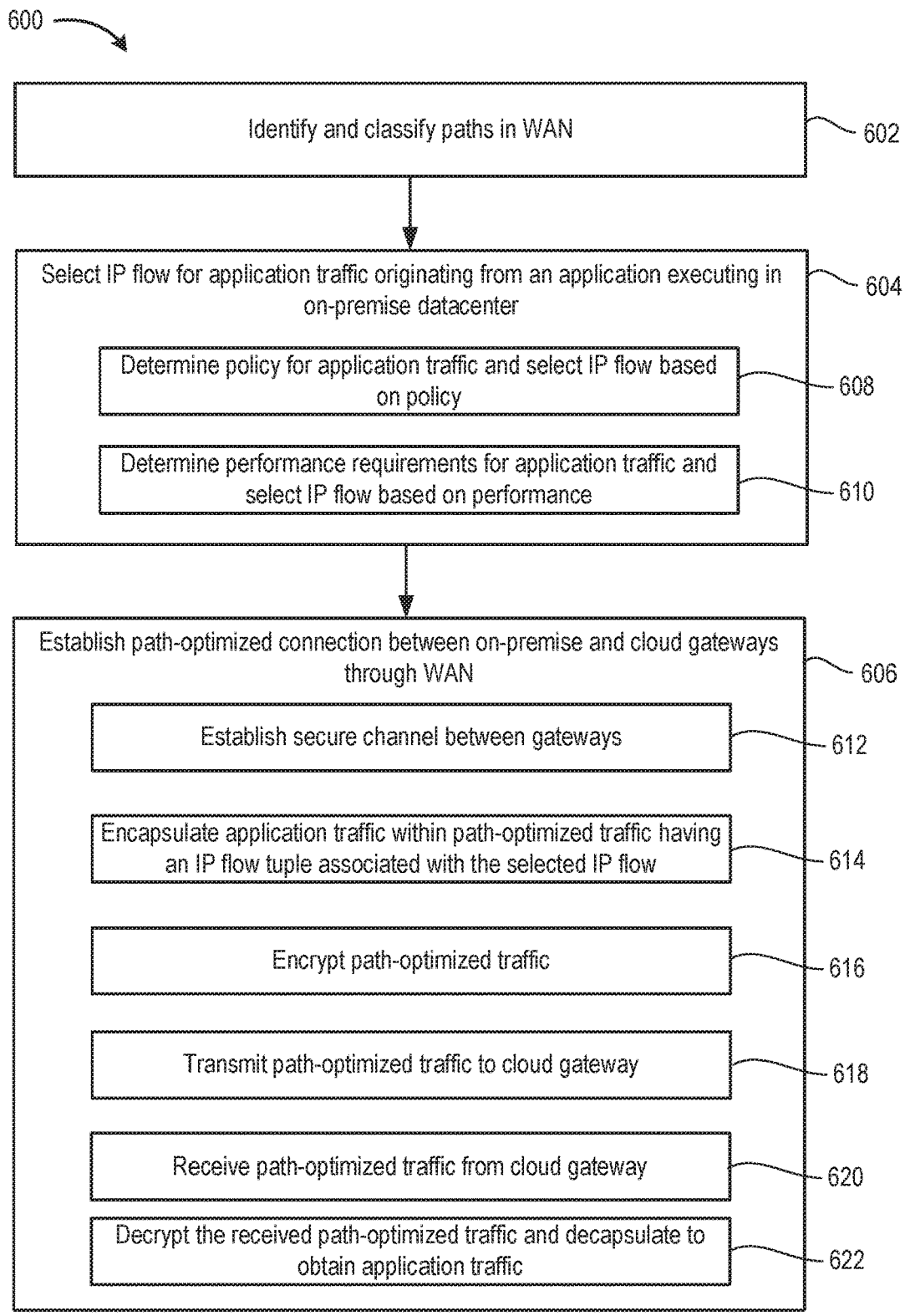
FIG. 6 is a flow diagram depicting a method of optimizing connectivity between data centers in a hybrid cloud computing system according to embodiments.

FIG. 6 is a flow diagram depicting a method 600 of optimizing connectivity between data centers in a hybrid cloud computing system according to embodiments. Method 600 is described as being performed by on-premise gateway 124, but can be performed by any other gateway within hybrid cloud computing system.

Method 600 begins at step 602, where on-premise gateway 124 identifies and classifies paths in WAN. For example, on-premise gateway 124 can perform method 400 described above to maintain database 500 described above. At step 604, on-premise gateway 124 selects an IP flow for application traffic originating from an application 302. For example, at step 608, on-premise gateway 124 can determine a policy for the application traffic and select an IP flow based on the determined policy. As noted above, an administrator can assign a policy to particular types of application traffic, or on-premise gateway 124 can automatically assign a policy to the application traffic. Alternatively, at step 610, on-premise gateway 124 can determine performance requirements of the application traffic and select an IP flow based on performance. That is, rather than using policies, application traffic can be assigned to a particular IP flow based on performance requirements.

At step 606, on-premise gateway 124 establishes a path-optimized connection between to cloud gateway 184 through WAN 140. A path-optimized connection is a connection selected for the application traffic based on performance or policy, as described above. Step 606 can include various sub-steps. At step 612, on-premise gateway 124 can establish a secure channel with cloud gateway 184 (e.g., a VPN connection). When establishing the secure channel, on-premise gateway 124 can communicate with cloud gateway 184 through WAN 140. On-premise gateway 124 can inform cloud gateway 184 of the IP flow to be used for the secure channel.

At step 614, on-premise gateway 124 can encapsulate the application traffic within path-optimized traffic having an IP flow tuple associated with the selected IP flow. At step 616, on-premise gateway 124 encrypts the path-optimized traffic in accordance with the parameters of the established secure channel. At step 618, on-premise gateway 124 transmits the path-optimized traffic to cloud gateway 184 over the secure channel. At step 620, on-premise gateway 124 receives path-optimized traffic from cloud gateway 184 over the secure channel. At step 622, on-premise gateway 124 decrypts the path-optimized traffic and decapsulates the path-optimized traffic obtain application traffic.

Multi-Spoke Hybridity

Figure 7:
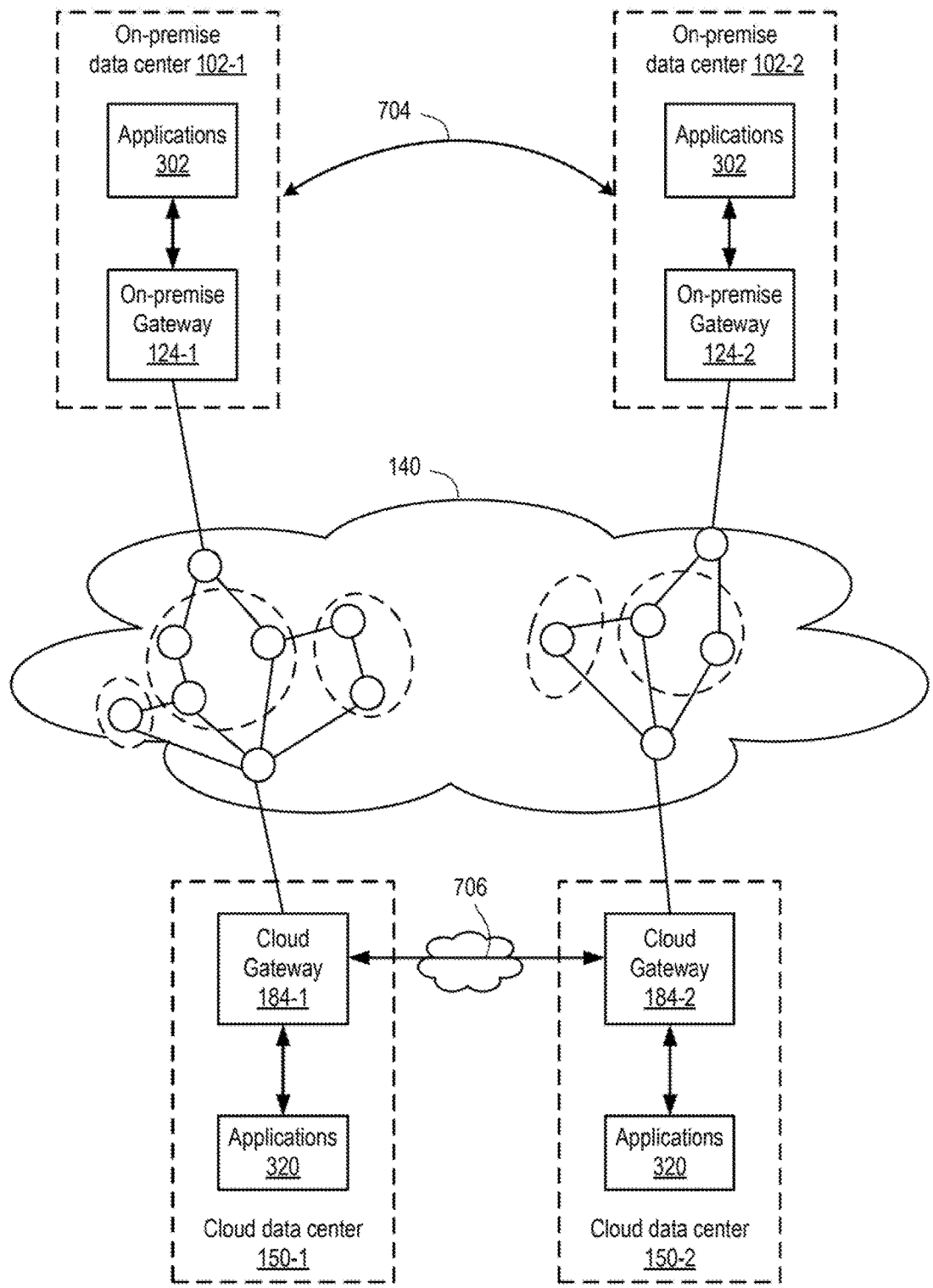
FIG. 7 is a block diagram depicting a logical view of a hybrid cloud computing system according to embodiments.

FIG. 7 is a block diagram depicting a logical view of hybrid cloud computing system 100 according to embodiments. In the depicted embodiment, an organization has a first on-premise data center 102-1 and a second on-premise data center 102-2. The organization is a tenant within the cloud computing system that includes a plurality of data centers, including a first cloud data center 150-1 and a second cloud data center 150-2. In some embodiments, the first on-premise data centers 102-1 is communicatively coupled to first cloud data center 150-1, and second on-premise data center 102-2 is communicatively coupled to the second cloud data center 150-2. Further, the first and second on-premise data centers 102 may be communicatively coupled together via a connection 704. Similarly, cloud data centers 150 may be communicatively coupled together via a connection 706.

In one embodiment, the connectivity between data centers is arranged based on geographic locations and/or network providers. The organization may have the on-premise data centers located in different sites, e.g., New York and California, and may communicatively couple on-premise data centers to their closest cloud data center. For example, the organization might communicatively couple a New York (on-premise) data center to the closest cloud data center, e.g., a cloud data center 150-1 located in Virginia, and couple the California (on-premise) data center to a cloud data center 150-2 located in Las Vegas.

In one embodiment, applications 302 in a first on-premise data center 102-1 may wish to communicate and/or cooperate with another applications 302 in the other on-premise data center 102-2. However, in some cases, connection 704 between on-premise data centers may be poor, or suffer from low priority status among network providers such that traffic management schemes run by the network providers may affect connectivity between the data centers, as described above. Conversely, connection 706 between cloud data centers may be a high-performance connection having high-performance service level agreements arranged by the second organization managing the cloud computing system.

According to one or more embodiments, gateways 124, 184 within the data centers are configured to coordinate to establish a path-optimized connection between the first on-premise data center that travels through the cloud data centers using the connection 706 to the second on-premise data center.

Figure 8:
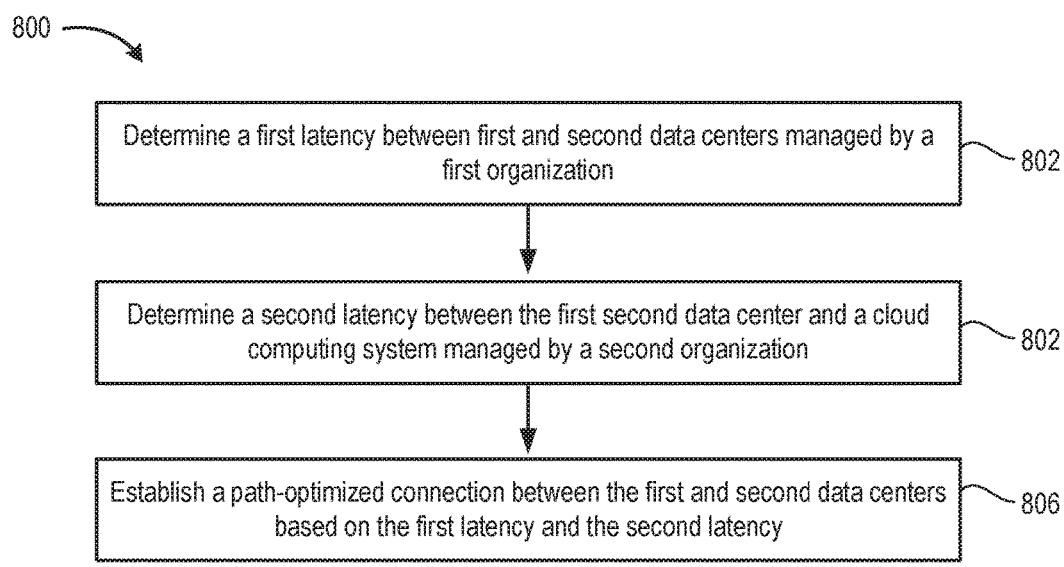
FIG. 8 is a flow diagram depicting a method of providing connectivity between data centers in a hybrid cloud computing system according to embodiments.

FIG. 8 is a flow diagram depicting a method 800 of optimizing connectivity between data centers in a hybrid cloud computing system according to embodiments. Method 800 is described as being performed by on-premise gateway 124, but can be performed by any other gateway (e.g., gateways 124, 184, together or independently) within hybrid cloud computing system. As mentioned above, the cloud computing system may include a first cloud data center communicatively coupled to the first data center and a second cloud data center communicatively coupled to the second data center, wherein the first and second cloud data centers are communicatively coupled together (e.g., via connection 704).

At step 802, gateway 124 determines a first latency between first and second data centers 102-1, 102-2 managed by a first organization. At step 804, gateway 124 determines a second latency between the first data center 102-1 and a cloud computing system 150 managed by a second organization, the first organization being a tenant in the cloud computing system. In some embodiments, to form the connection between the first data center 102-1 and the cloud computing system 150-1, gateway 124 probes a WAN with test packets by varying an IP flow tuple of the test packets across a set of IP flows, as discussed above. Gateway 124 can identify multiple paths between gateway 124 of first data center 102-1 and gateway 184-1 of cloud computing system 150-1, and select an IP flow from the set of IP flows for an application 302 executing in the first data center 102-1.

At step 806, gateway 124 establishes a path-optimized connection between the first and second data centers based on the first latency and the second latency. As defined herein, "optimized" is meant to indicate that the preferred path is selected on the basis of the latency-relevant criteria set forth in this patent document. This path-optimized connection travels between a gateway 124-1 of the first data center through a gateway (e.g., 184-1, 184-2) of the cloud computing system and to a gateway 124-2 of the second data center 102-2. In some embodiments, the path-optimized connection through the gateway of the cloud computing system comprises the path-optimized connection through a gateway 124-1 of the first cloud data center to a gateway 184-1 of the second cloud data center and to the gateway 124-2 of the second data center.

In some embodiments, the path-optimized connection between the first and second data centers is established responsive to determining that the second latency is less than the first latency. In some embodiments, the gateways compare the first and second latencies, and if the latency of a connection (including connection 706) through the cloud computing system is still less than the latency of the connection 704, the gateways establish the path-optimized connection through the cloud computing system. In some embodiments, the gateways use egress optimization of the virtual machine routing traffic to determine the connectivity model between data centers.

In some embodiments, gateway 124 establishes the path-optimized connection by establishing a secure channel between gateway 124 of first data center 102-1 and gateway 108-1 of cloud computing system 150-1. Gateway 124 encapsulates application packets from application 302 within path-optimized packets according to the selected IP flow, and may encrypt the path-optimized packets for transmission over the secure channel. In some embodiments, establishing the secure channel can include sending an IP flow tuple for the selected IP flow from the gateway of the first data center to gateway 108-1 of the cloud computing system.

Figure 9:
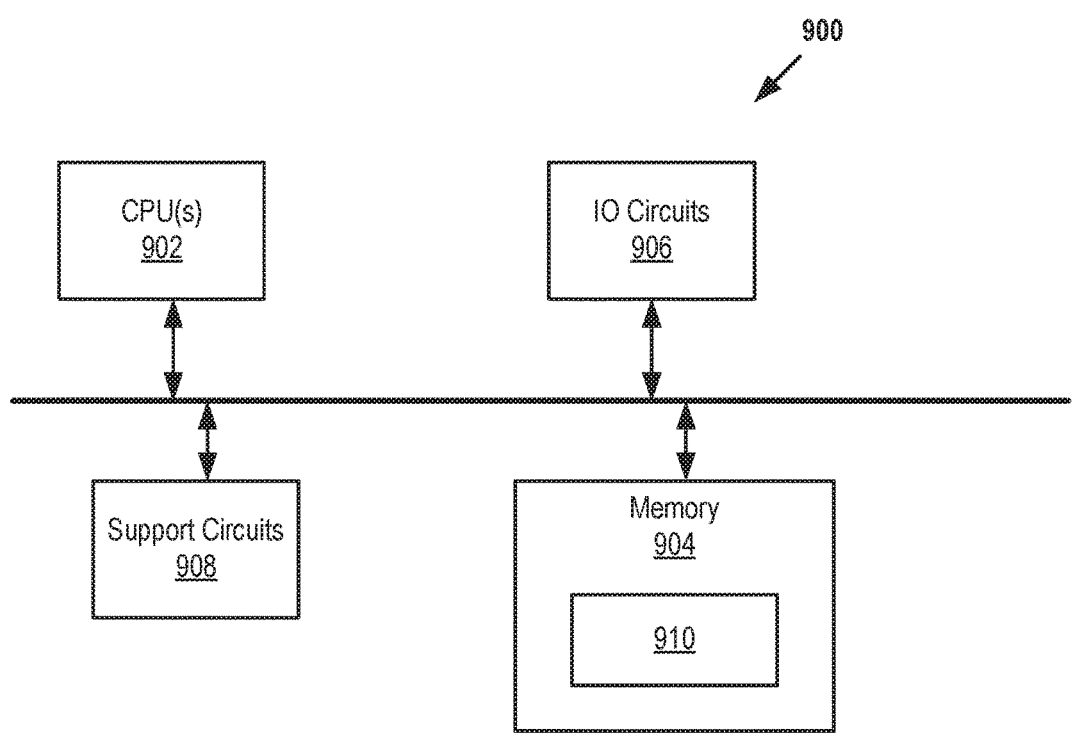
FIG. 9 is a block diagram depicting an example of a computer system in which one or more embodiments of the present disclosure may be utilized.

FIG. 9 is a block diagram depicting an example of a computer system 900 in which one or more embodiments of the present disclosure may be utilized. Computer system 900 can be used as a host to implement on-premise gateway 124, cloud gateway 184, or other gateway in a hybrid cloud computing system. Computer system 900 includes one or more central processing units (CPUs) 902, memory 904, input/output (TO) circuits 906, and various support circuits 908. Each of CPUs 902 can include any microprocessor known in the art and can execute instructions stored on computer readable storage, such as memory 904. Memory 904 can include various volatile and/or non-volatile memory devices, such as random access memory (RAM), read only memory (ROM), and the like. Instructions and data 910 for performing the various methods and techniques described above can be stored in memory 904 for execution by CPUs 902. That is, memory 904 can store instructions executable by CPUs 902 to perform one or more steps/sub-steps described above in FIGS. 4, 6, and 8. Support circuits 908 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of providing connectivity between data centers in a hybrid cloud system, the method comprising:
   transmitting and receiving first test packets including an Internet Protocol (IP) flow tuple between a gateway of a first data center managed by a first organization and a gateway of a second data center managed by the first organization, wherein the IP flow tuple includes a source IP address, source port, destination IP address, and destination port;
   determining a first latency between the first and second data centers managed by the first organization based on the first test packets;
   transmitting and receiving second test packets including an IP flow tuple between the gateway of the first data center and a gateway of a cloud computing system managed by a second organization;
   determining a second latency between the first data center and the cloud computing system managed by the second organization based on the second test packets, the first organization being a tenant in the cloud computing system; and
   establishing a path-optimized connection between the first and second data centers based on the first latency and the second latency, wherein the path-optimized connection travels between the gateway of the first data center through the gateway of the cloud computing system and to the gateway of the second data center.

2. The method of claim 1, wherein the cloud computing system comprises a first cloud data center communicatively coupled to the first data center and a second cloud data center communicatively coupled to the second data center, wherein the first and second cloud data centers are communicatively coupled together.

3. The method of claim 2, wherein the path-optimized connection through the gateway of the cloud computing system comprises a path-optimized connection through a gateway of the first cloud data center to a gateway of the second cloud data center.

4. The method of claim 1, wherein the path-optimized connection between the first and second data centers is established responsive to determining that the second latency is less than the first latency.

5. The method of claim 1, wherein transmitting and receiving the second test packets including the IP flow tuple between the first data centers and the cloud computing system comprises:
   probing a wide area network (WAN) with the second test packets by varying the IP flow tuple of the second test packets across a set of IP flows;
   identifying a plurality of paths between the gateway of the first data center and a gateway of the cloud computing system associated with the set of IP flows; and
   selecting an IP flow from the set of IP flows for an application executing in the first data center.

6. The method of claim 1, wherein the step of establishing the path-optimized connection comprises:
   establishing a secure channel between the gateway of the first data center and the gateway of the cloud computing system;
   encapsulating application packets from the application within path-optimized packets according to the selected IP flow; and
   encrypting the path-optimized packets for transmission over the secure channel.

7. The method of claim 6, wherein the step of establishing the secure channel comprises sending an IP flow tuple for the selected IP flow from the gateway of the first data center to the gateway of the cloud computing system.

8. A non-transitory computer-readable storage medium comprising instructions that, when executed in a computing device, provide connectivity between data centers in a hybrid cloud system, by performing the steps of:
   transmitting and receiving first test packets including an Internet Protocol (IP) flow tuple between a gateway of a first data center managed by a first organization and a gateway of a second data center managed by the first organization, wherein the IP flow tuple includes a source IP address, source port, destination IP address, and destination port;
   determining a first latency between the first and second data centers managed by the first organization based on the first test packets;
   transmitting and receiving second test packets including an IP flow tuple between the gateway of the first data center and a gateway of a cloud computing system managed by a second organization;
   determining a second latency between the first data center and the cloud computing system managed by the second organization based on the second test packets, the first organization being a tenant in the cloud computing system; and
   establishing a path-optimized connection between the first and second data centers based on the first latency and the second latency, wherein the path-optimized connection travels between the gateway of the first data center through the gateway of the cloud computing system and to the gateway of the second data center.

9. The non-transitory computer-readable storage medium of claim 8, wherein the cloud computing system comprises a first cloud data center communicatively coupled to the first data center and a second cloud data center communicatively coupled to the second data center, wherein the first and second cloud data centers are communicatively coupled together.

10. The non-transitory computer-readable storage medium of claim 9, wherein the path-optimized connection through the gateway of the cloud computing system comprises a path-optimized connection through a gateway of the first cloud data center to a gateway of the second cloud data center.

11. The non-transitory computer-readable storage medium of claim 8, wherein the path-optimized connection between the first and second data centers is established responsive to determining that the second latency is less than the first latency.

12. The non-transitory computer-readable storage medium of claim 8, wherein transmitting and receiving the second test packets including the IP flow tuple between the first data centers and the cloud computing system comprises:
   probing a wide area network (WAN) with the second test packets by varying the IP flow tuple of the second test packets across a set of IP flows;
   identifying a plurality of paths between the gateway of the first data center and a gateway of the cloud computing system associated with the set of IP flows; and
   selecting an IP flow from the set of IP flows for an application executing in the first data center.

13. The non-transitory computer-readable storage medium of claim 8, wherein the step of establishing the path-optimized connection comprises:
- establishing a secure channel between the gateway of the first data center and the gateway of the cloud computing system;
- encapsulating application packets from the application within path-optimized packets according to the selected IP flow; and
- encrypting the path-optimized packets for transmission over the secure channel.

14. The non-transitory computer-readable storage medium of claim 13, wherein the step of establishing the secure channel comprises sending an IP flow tuple for the selected IP flow from the gateway of the first data center to the gateway of the cloud computing system.

15. A computer system for provide connectivity between data centers in a hybrid cloud system, the computer system comprising a system memory and a processor programmed to:
- transmit and receive first test packets including an Internet Protocol (IP) flow tuple between a gateway of a first data center managed by a first organization and a gateway of a second data center managed by the first organization, wherein the IP flow tuple includes a source IP address, source port, destination IP address, and destination port;
- determine a first latency between the first and second data centers managed by the first organization;
- transmit and receive second test packets including an IP flow tuple between the gateway of the first data center and a gateway of a cloud computing system managed by a second organization;
- determine a second latency between the first data center and the cloud computing system managed by a second organization based on the second test packets, the first organization being a tenant in the cloud computing system; and
- establish a path-optimized connection between the first and second data centers based on the first latency and the second latency, wherein the path-optimized connection travels between the gateway of the first data center through the gateway of the cloud computing system and to the gateway of the second data center.

16. The computer system of claim 15, wherein the cloud computing system comprises a first cloud data center communicatively coupled to the first data center and a second cloud data center communicatively coupled to the second data center, wherein the first and second cloud data centers are communicatively coupled together.

17. The computer system of claim 16, wherein the path-optimized connection through the gateway of the cloud computing system comprises a path-optimized connection through a gateway of the first cloud data center to a gateway of the second cloud data center.

18. The computer system of claim 15, wherein the path-optimized connection between the first and second data centers is established responsive to determining that the second latency is less than the first latency.

19. The computer system of claim 15, wherein transmitting and receiving the second test packets including the IP flow tuple between the first data centers and the cloud computing system comprises:
- probing a wide area network (WAN) with the second test packets by varying the IP flow tuple of the second test packets across a set of IP flows;
- identifying a plurality of paths between the gateway of the first data center and a gateway of the cloud computing system associated with the set of IP flows; and
- selecting an IP flow from the set of IP flows for an application executing in the first data center.

20. The computer system of claim 15, wherein the processor configured to establish the path-optimized connection is further configured to:
- establish a secure channel between the gateway of the first data center and the gateway of the cloud computing system;
- encapsulate application packets from the application within path-optimized packets according to the selected IP flow; and
- encrypt the path-optimized packets for transmission over the secure channel.

* * * * *